United States Patent
Davis et al.

[11] Patent Number: 5,898,115
[45] Date of Patent: Apr. 27, 1999

[54] POLE INSTALLED X-Y SCANNER

[75] Inventors: Trevor James Davis, Charlotte; Robert Francis Grizzi, Cornelius, both of N.C.

[73] Assignee: General Electric Company, Schenectady, N.Y.

[21] Appl. No.: 09/052,323

[22] Filed: Mar. 31, 1998

[51] Int. Cl.[6] .................................................. G21C 17/00
[52] U.S. Cl. .......................................................... 73/865.8
[58] Field of Search .............................. 73/865.8, 866.5, 73/600, 622, 623; 324/219, 220; 376/249

[56] References Cited

U.S. PATENT DOCUMENTS

| | | | |
|---|---|---|---|
| 3,809,607 | 5/1974 | Murray et al. | 73/623 |
| 3,862,578 | 1/1975 | Schluter | 73/623 |
| 4,169,758 | 10/1979 | Blackstone et al. | 376/249 |
| 4,311,556 | 1/1982 | Iwamoto et al. | 376/249 |
| 4,368,644 | 1/1983 | Wentzell et al. | 376/249 |
| 5,009,105 | 4/1991 | Richardson et al. | 376/249 |
| 5,183,625 | 2/1993 | Batistoni | 376/249 |
| 5,503,033 | 4/1996 | Van Niekerk | 73/865.8 |

*Primary Examiner*—Robert Raevis
*Attorney, Agent, or Firm*—Armstrong Teasdale LLP

[57] ABSTRACT

Methods and apparatus for examining a nuclear reactor shroud are described. In one embodiment the inspection apparatus includes a scanner subassembly movably coupled to a base subassembly. The base subassembly includes a linear bearing attached to a first end of the base assembly and positioned to extend from the top to the bottom of the base assembly. At least one jacking cylinder is coupled to the second end of the base assembly. The scanner subassembly includes a mounting member movably coupled to the linear bearing, a rotating member pivotally coupled to the mounting member, an elongate radial bearing coupled to the mounting member, and a carriage assembly movably coupled to the radial bearing. The carriage assembly includes a scanner arm, and the scanner arm includes an inspection probe coupled to each end of the arm. The scanner arm is configured to be parallel to the radial bearing.

14 Claims, 4 Drawing Sheets

POLE INSTALLED X-Y SCANNER

FIELD OF THE INVENTION

This invention relates generally to nuclear reactors and more particularly, to methods and apparatus for examining a shroud within such reactors.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide.

Intergranular Stress Corrosion Cracking (IGSCC) is a known phenomenon occurring in reactor components, such as structural members, shrouds, piping, fasteners, and welds, exposed to stress in a corrosive environment. Typically, IGSCC initiates from a crevice at the base material along a weld in what is referred to as the heat affected zone. Reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to IGSCC.

Over the life of the reactor, the shroud is often inspected to verify integrity. For example, the shroud welds must be periodically inspected for Intergranular Stress Corrosion Cracking (IGSCC). Such inspections are typically performed with ultrasonic transducer type inspection tools. Based upon such inspections, the shroud may require either repair or replacement. It is sometimes necessary to supplement the data obtained by the primary inspection tooling to increase the volumetric coverage of circumferential welds of the shroud before the decision to repair or replace can be made.

It would be desirable to provide a compact, easy to use, supplemental, automated, ultrasonic inspection system to enhance the percentage of volumetric weld coverage. It would also be desirable to provide a supplemental inspection tool that can be delivered to the appropriate weld location by a handling pole from the refueling platform of the reactor. It would further be desirable to provide such an apparatus that is operated remotely from adjacent the reactor cavity.

SUMMARY OF THE INVENTION

These and other objects may be attained by a pole installed X–Y scanner inspection apparatus. The inspection apparatus includes a base subassembly and a scanner subassembly movably coupled to the base subassembly. The base subassembly includes a handling pole adapter coupled to the top of the base assembly. The pole adapter is configured to couple with a handling pole. The inspection apparatus is lowered into place in the reactor by use of the handling pole.

The scanner subassembly includes a mounting plate that is movably coupled to the base subassembly. The mounting plate is configured to ride on an elongate linear bearing or track that is attached to the front side of the base subassembly. The front side of the base subassembly is the side that faces the shroud when the inspection apparatus is installed in the reactor. The vertical position of the scanner subassembly is controlled by movement of the mounting plate along the linear bearing between the top and the bottom of the base subassembly.

A rotating member is pivotally coupled to the mounting plate. An elongate radial bearing is coupled to the rotating member. The radial bearing has a curved shape and is configured to conform to the radius of the shroud to inspected. The rotating member rotates between two positions. At the first position, or installation mode position, the elongate radial bearing is positioned parallel to the linear bearing. At the second position, or scan mode position, the radial bearing is positioned perpendicular to the linear bearing.

A scanner carriage is coupled to the radial bearing and is configured to ride on the radial bearing. The carriage includes an elongate scan arm. The length of the scan arm is longer than the width of the carriage so that the scan arm extends from both ends of the carriage. An inspection probe is coupled to each end of the scan arm. The scan arm is positioned to be parallel to the radial bearing. The horizontal position of the inspection probes is controlled by movement of the carriage between the ends of the radial bearing. When the carriage is at an end of the radial bearing, the scan arm extends outside the extent of the radial bearing, thereby extending the scan reach of the inspection tool.

At least one jacking cylinder extension is coupled to the back side of the base subassembly. The jacking cylinders are configured to movably extend from the inspection apparatus and engage the sidewall of the reactor pressure vessel. This action causes the inspection probes to move into engagement with the shroud to facilitate proper scanning of the shroud. The jacking cylinders also wedge the inspection tool into place between the sidewall and the shroud so as to maintain proper positioning for accurate scanning of the shroud.

To scan the shroud, and more specifically, the shroud welds, a handling pole is coupled to the inspection apparatus and the rotating member is pivoted to the installation mode position with the radial bearing parallel to the linear bearing. In the installation mode, the inspection tool has a narrow profile which allows for easy installation between pressure vessel obstacles such as jet pumps, jet pump diffusers, and miscellaneous piping.

The inspection tool is then manually lowered into the reactor pressure vessel between the vessel sidewall and the shroud with the handling pole. The rotating member is rotated to the scan mode position with the radial bearing positioned perpendicular to the linear bearing. The jacking cylinders are then actuated so that they engage the sidewall of the vessel, thus causing the inspection probes to engage the shroud. With the jacking cylinders engaging the vessel sidewall and the inspection probes engaging the shroud, the inspection tool is wedged into proper position to operate correctly.

Once the inspection apparatus is properly positioned, the scanner subassembly scans the shroud welds. Particularly, in one embodiment, the radial bearing is moved to the first end, or top end, of the linear bearing, with the scanner carriage positioned at a first end of the radial bearing. The carriage is then moved between the first and second ends of the radial bearing as the inspection probes perform a complete scan for each weld. The radial bearing is then moved towards the second, or bottom, end of the linear bearing a distance equal to the height of the completed scan. This scan procedure is repeated until the radial bearing is adjacent the bottom end of the linear bearing. The jacking cylinders are then disengaged and the rotating member is pivoted into the installation mode position. The inspection apparatus may then be manually repositioned to the next area to scan. The inspection apparatus is reinstalled at the new position and another series of scans are performed as described above.

This scanning procedure is repeated until the area of interest or the entire shroud has been scanned. Upon completion of the scanning, the inspection apparatus is removed from the reactor pressure vessel. Specifically, the jacking cylinders are disengaged and the rotating member is pivoted into the installation mode position. The inspection apparatus is then manually lifted out of the vessel with the handling pole. The resulting scan data is analyzed to determine any necessary maintenance activities.

The above described apparatus facilitates inspection of a nuclear reactor shroud with a handling pole delivered inspection tool. The inspection apparatus is compact, automated, and easy to use. The inspection tool may be used to supplement existing scan data or may be used as the primary scanner for inspecting reactor shroud welds.

DETAILED DESCRIPTION

Figure 1:
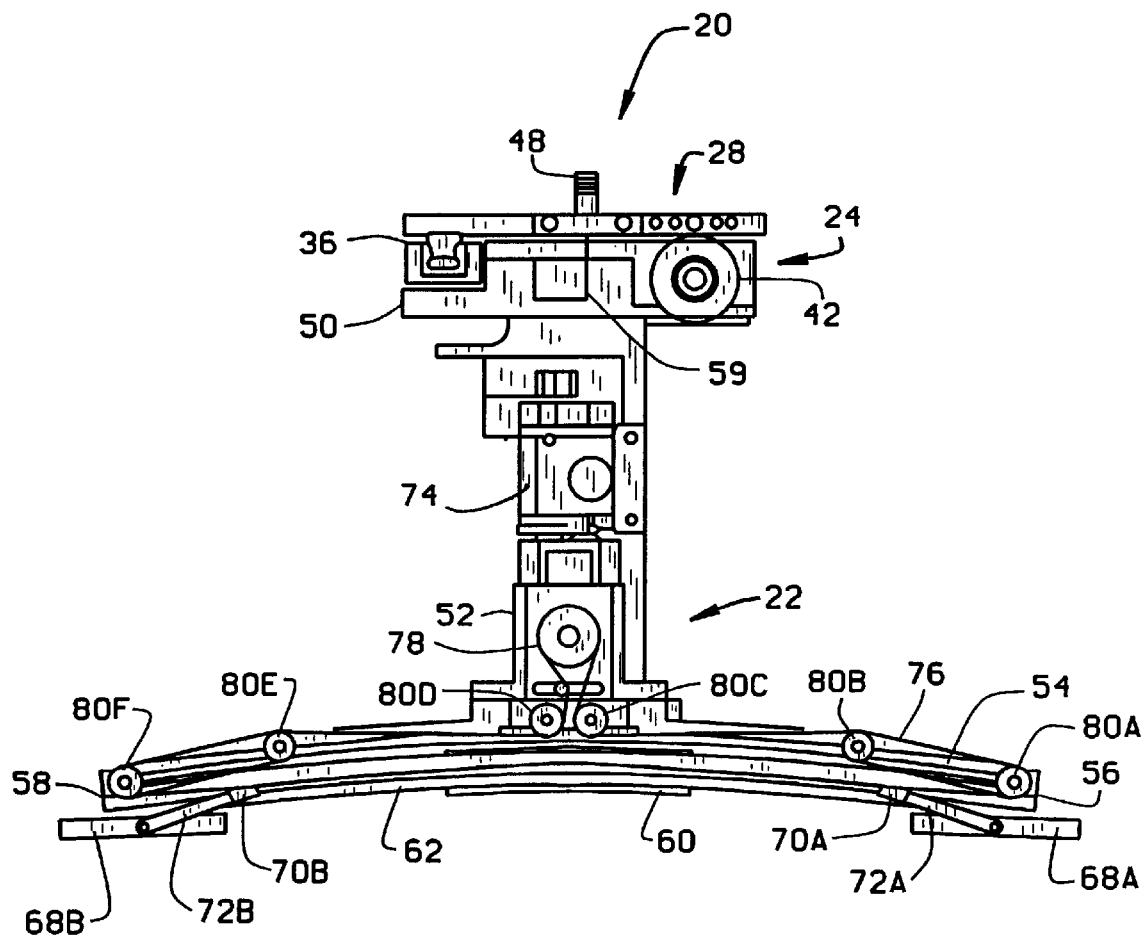
FIG. 1 is a top view of an inspection apparatus in accordance with one embodiment of the present invention.
Figure 2:
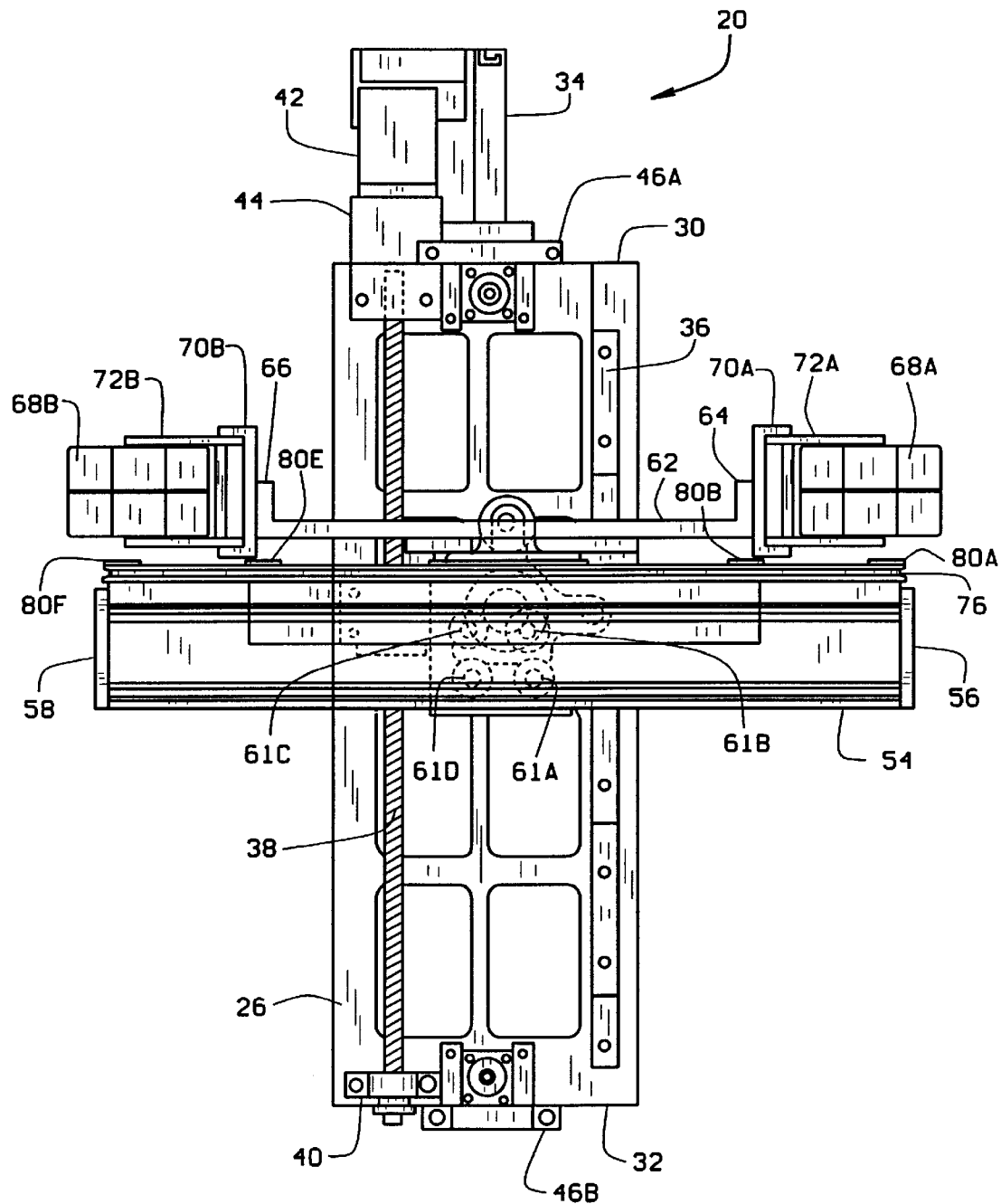
FIG. 2 is a front view of the inspection apparatus shown in FIG. 1.

Referring to FIGS. 1 and 2, FIG. 1 is a top view of an inspection apparatus 20 and FIG. 2 is a front view of inspection apparatus 20. Inspection apparatus 20 includes a scanner subassembly 22 movably coupled to a base subassembly 24. Base subassembly 24 has a first end 26, a second end 28, a top 30, and a bottom 32. A handling pole adapter 34 is coupled to base assembly top 30. Handling pole adapter 34 is configured to couple with a handling pole (not shown) which is used to lower inspection apparatus 20 into place in a reactor pressure vessel. An elongate linear bearing or track 36 is attached to first end 26 of base 24. Linear bearing 36 is positioned to extend between top 30 and bottom 32 of base subassembly 24. A screw drive 38 is attached to base assembly first end 26, and is positioned parallel to linear bearing 36. A screw drive bracket 40 couples screw drive 38 to base subassembly end 26. A stepper motor 42 is coupled to gear box assembly 44 which is attached to base assembly top 30. Gear box assembly 44 is coupled screw drive 38. Endplate standoffs 46A and 46B are attached to base assembly end 26 at top 30 and bottom 32 respectively. At least one jacking cylinder 48 (one shown) is coupled to second end 28 of base subassembly 24. Typically, inspection apparatus 20 contains two jacking cylinders 48, but apparatus 20 may contain more than two jacking cylinders 48.

Scanner subassembly 22 includes a mounting plate 50 movably coupled to base subassembly 24. Mounting plate 50 is configured to ride on linear bearing 36. Screw drive 38 is coupled to mounting plate 50. The vertical position of scanner subassembly 22 is controlled by the movement of mounting bracket 50 along linear bearing 36.

A rotating member 52 is pivotally coupled to mounting plate 50. An elongate radial bearing 54 is coupled to rotating member 52. Radial bearing 54 has a first end 56 and a second end 58 and is configured to conform to the radius of the reactor pressure vessel shroud being inspected. Bearing 59 permits rotating member 52 to rotate between two positions. At the first position, or installation mode position, elongate radial bearing 54 is positioned parallel to linear bearing 36. At the second position, or scan mode position, radial bearing 54 is positioned perpendicular to linear bearing 36.

A scanner carriage 60 is coupled to radial bearing 54 by radial bearing wheels 61A, 61B, 61C and 61D. Carriage 60 is configured to ride on radial bearing 54 and move between first end 56 and second end 58 of radial bearing 54. An elongate scanner arm 62 is coupled to carriage 60. Scanner arm 62 has a first end 64 and a second end 66 and is positioned to be parallel to radial bearing 54. The length of scanner arm 62 is longer than the width of scanner carriage 60 so that scan arm 62 extends from both ends of carriage 60.

Inspection probes 68A and 68B are coupled to scanner arm 62 at ends 64 and 66 respectively. Probe mounting brackets 70A and 70B are attached to arm 62 at ends 64 and 66 respectively. Pivot brackets 72A and 72B are pivotally coupled to mounting brackets 70A and 70B respectively and are pivotally coupled to inspection probes 68A and 68B respectively. Typically, inspection probes 68A and 68B are ultrasonic transducer type probes.

A stepper motor 74 is attached to rotating member 52. A drive belt 76 is coupled to stepper motor 74 by drive pulley 78 and is also coupled to carriage 60. Drive belt 76 passes over guide rollers 80A, 80B, 80C, 80D, 80E, and 80F. Drive belt moves carriage 60 between first end 56 and second end 58 of radial bearing 54.

Figure 3:
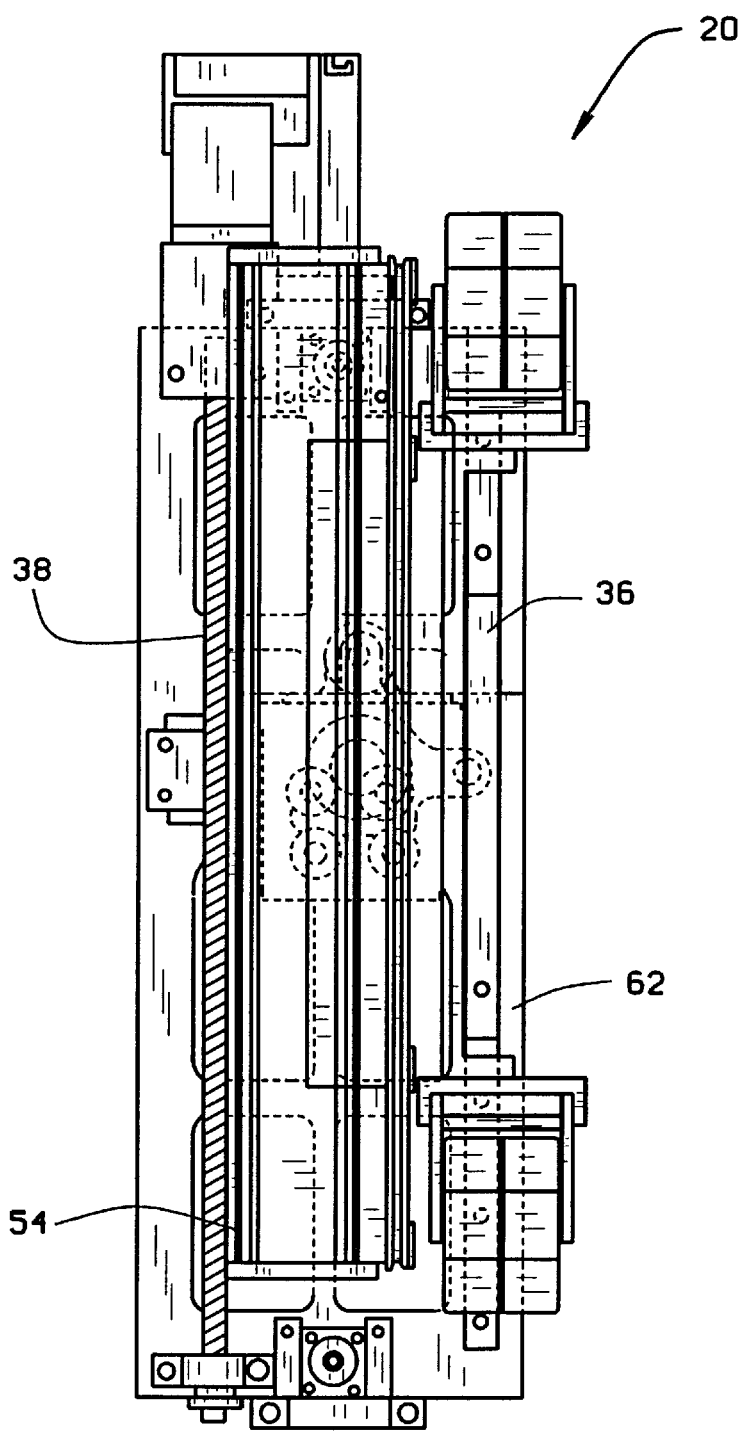
FIG. 3 is a front view of the inspection apparatus shown in FIG. 1 in its installation mode position.

FIG. 3 is a front view of inspection apparatus 20 illustrating rotating member 52 rotated to installation mode position. In the installation mode position, radial bearing 54 and scan arm 62 are positioned parallel to linear bearing 36 and screw drive 28.

Figure 4:
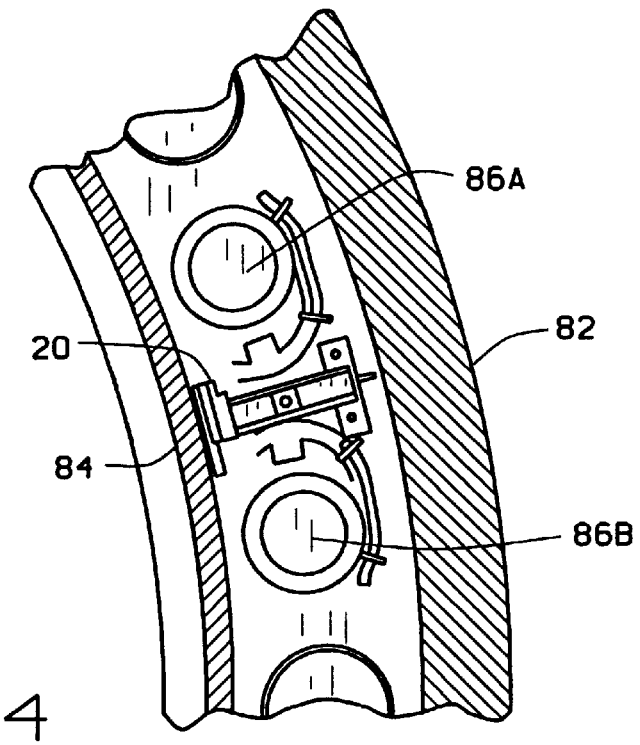
FIG. 4 is a cut away top view of a nuclear reactor vessel illustrating the inspection apparatus shown in FIG. 1 in the installation mode position.

FIG. 4 is a cut away top view of a reactor pressure vessel illustrating inspection apparatus 20 with rotating member 52 rotated to the installation mode position. Inspection apparatus 20 is located between reactor pressure vessel sidewall 82 and reactor shroud 84. The inspection mode position permits the installation of inspection apparatus between jet pump diffusers 86A and 86B.

Figure 5:
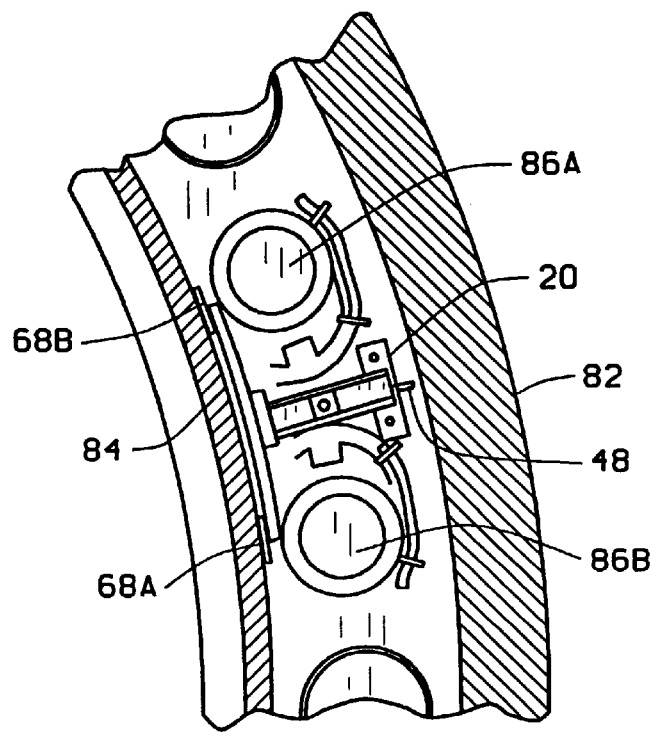
FIG. 5 is a cut away top view of a nuclear reactor vessel illustrating the inspection apparatus shown in FIG. 1 installed in the reactor vessel and in scan mode position.

FIG. 5 is a cut away top view of a reactor pressure vessel illustrating inspection apparatus 20 with rotating member 52 rotated to the scan mode position. Inspection apparatus 20 is installed between reactor pressure vessel sidewall 82 and reactor shroud 84. Jacking cylinder 48 is extended and engages sidewall 82 which causes inspection probes 68A and 68B to engage shroud 84.

To scan shroud 84 with inspection apparatus 20, a handling pole (not shown) is coupled to handling pole 34, and rotating member 52 is rotated to installation mode position where radial bearing 54 is positioned parallel to linear bearing 36. In this installation mode position, inspection apparatus 20 has a narrow profile which permits installation between pressure vessel obstacles such as jet pump diffusers 86A and 86B.

Inspection tool apparatus 20 is manually lowered into the area between vessel sidewall 82 and shroud 84. Rotating member 52 is then rotated to scan mode position where radial bearing 54 is positioned perpendicular to linear bearing 36. Rotating member 52 is rotated through manual manipulation of ropes (not shown) attached to opposite ends of rotating member 52. Standoffs 46A and 46B are used to adjust the distance of scan arm 62 to shroud 84. Jacking cylinder 48 is then activated so that jacking cylinder extends and engages vessel sidewall 82. The action of jacking cylinder 48 engaging sidewall 82 causes inspection probes 68A and 68B to engage shroud 84. The pressure exerted by jacking cylinder 48 on sidewall 82 and inspection probes 68A and 68B on shroud 84 wedges inspection apparatus 20 into proper operational position. Additionally, for inspection probes 68A and 68B to work properly they should be in face to face contact with shroud 84.

Once inspection apparatus 20 is is properly position, scanner subassembly 22 scans shroud 84. Particularly, in one embodiment, radial bearing 54 is moved along linear bearing 36 so as to be adjacent base subassembly top 30. Scanner carriage 60 is positioned at first end 56 of radial bearing 54. Carriage 60 is then moved between first end 56 and second end 58 of radial bearing 54 as inspection probes 68A and 68B perform a complete scan of shroud 84. Radial bearing 54 is then moved along linear bearing 36 towards base subassembly bottom 32 a distance equal to the height of the completed scan. Scanner carriage 60 is then moved between second end 58 and first end 56 of radial bearing 54 as inspection probes 68A and 68B perform a scan of shroud 84. The scan procedure is repeated until radial bearing 48 has moved adjacent to base subassembly bottom 32. Jacking cylinder 48 is then disengaged from vessel sidewall 82 and rotating member 52 is pivoted into installation mode position. Inspection apparatus 20 may then be manually repositioned to the next area of shroud 84 to be scanned. Inspection apparatus 20 is then reinstalled at the new position and another series of scans are performed as described above.

The scanning procedure is repeated until the area of interest or the entire area of shroud 84 has been scanned. Upon completion of scanning shroud 84, inspection apparatus 20 is removed from between vessel sidewall 82 and shroud 84. Specifically, jacking cylinder 48 is disengaged and rotating member 52 is rotated into the installation mode position. Inspection apparatus 20 is then lifted out of the vessel using a handling pole (not shown). The resulting scan data is analyzed to determine any necessary maintenance activities.

Inspection apparatus 20 described above facilitates inspection of a nuclear reactor shroud 84. Inspection apparatus 20 is compact, automated, easy to use, and is delivered into position with a handling pole. Inspection apparatus 20 may be used to supplement existing scan data or may be used as the primary scanner for inspecting reactor shrouds.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A pole mounted inspection apparatus for inspecting a shroud in a reactor pressure vessel of a nuclear reactor, the reactor pressure vessel having a sidewall, said apparatus comprising:

a base subassembly having a first end, a second end, a top, and a bottom, said base subassembly comprising a handling pole adapter coupled to said top of said base subassembly and an elongate linear bearing attached to said first end of said base subassembly, said linear bearing positioned to extend from said top to said bottom of said base subassembly; and a scanner subassembly movably coupled to said base subassembly, said scanner subassembly configured to inspect the shroud welds.

2. An inspection apparatus in accordance with claim 1 wherein said base subassembly further comprises at least one jacking cylinder coupled to said second end of said base subassembly, said jacking cylinder configured to wedge said inspection apparatus in place between the shroud and the reactor pressure vessel sidewall.

3. An inspection apparatus in accordance with claim 1 wherein said scanner subassembly comprises:

a mounting member movably coupled to said base subassembly, said mounting member configured to ride on said linear bearing;

a rotating member pivotally coupled to said mounting member;

an elongate radial bearing coupled to said mounting member; and a carriage assembly movably coupled to said radial bearing, said carriage configured to ride on said radial bearing.

4. An inspection apparatus in accordance with claim 3 wherein said carriage assembly comprises a scanner arm.

5. An inspection apparatus in accordance with claim 4 wherein said scanner arm comprises an inspection probe coupled to a first end and an inspection probe coupled to a second end of said scanner arm.

6. An inspection apparatus in accordance with claim 5 wherein said inspection probes are ultrasonic transducer type probes.

7. An inspection apparatus in accordance with claim 3 wherein said scanner subassembly further comprises a motor assembly coupled to said carriage and configured to control a horizontal position of said carriage.

8. An inspection apparatus in accordance with claim 7 wherein said scanner subassembly further comprises a drive belt coupled to said motor and coupled to said carriage assembly, said drive belt configured to move said carriage assembly between a first end and a second end of said radial bearing.

9. An inspection apparatus in accordance with claim 3 wherein said base subassembly further comprises a motor assembly coupled to said mounting member and configured to control a vertical position of said mounting member.

10. An inspection apparatus in accordance with claim 9 wherein said base subassembly further comprises a drive screw coupled to said motor assembly and coupled to said mounting member, said drive screw configured to move said mounting member between a first end and a second end of said linear bearing.

11. A method for inspecting shroud welds of a nuclear reactor pressure vessel shroud using an inspection apparatus, the pressure vessel having a sidewall, the inspection apparatus including a scanner subassembly movably coupled to a base subassembly having a top, a bottom, a first end and a second end, the base subassembly including a linear bearing attached to the first end of the base assembly and positioned to extend from the top to the bottom of the base assembly, at least one jacking cylinder coupled to the second end of the base assembly, the scanner subassembly including a mounting member movably coupled to the linear bearing, a rotating member pivotally coupled to the mounting member, an elongate radial bearing coupled to the mounting member, and a carriage assembly movably coupled to the radial bearing, the carriage assembly including a scanner arm, the scanner arm including an inspection probe coupled to each end of the arm, the scanner arm configured to be parallel to the radial bearing, said method comprising the steps of:

installing the inspection apparatus in the reactor; and scanning the shroud welds with the inspection apparatus.

12. A method in accordance with claim 11 wherein installing the inspection apparatus comprises the steps of:

pivoting the rotatable member so that the radial bearing is parallel to the linear bearing;

inserting the inspection apparatus into the reactor pressure vessel between the shroud and the vessel sidewall;

pivoting the rotatable member so that the radial bearing is perpendicular to the linear bearing; and extending the jacking cylinder to engage the vessel sidewall.

13. A method in accordance with claim 11 wherein scanning the shroud welds comprises the step of moving the scanner carriage between the first and second ends of the radial bearing.

14. A method in accordance with claim 13 wherein scanning the shroud welds further comprises the step of moving the radial bearing between the first and second ends of the linear bearing.

* * * * *